(12) United States Patent
Kim et al.

(10) Patent No.: US 12,724,159 B2
(45) Date of Patent: Sep. 1, 2026

(54) METHOD AND APPARATUS FOR LOCATION INFORMATION ACQUISITION IN GNSS SHADOW AREA USING DRONES INCLUDING PRISM

(71) Applicant: NATIONAL DISASTER MANAGEMENT RESEARCH INSTITUTE, Ulsan (KR)

(72) Inventors: Seong Sam Kim, Ulsan (KR); Jae-Wook Seok, Ulsan (KR); Yong-Han Jung, Ulsan (KR); Eon-taek Lim, Ulsan (KR); Seul Koo, Ulsan (KR); Cheol-Kyu Lee, Ulsan (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 74 days.

(21) Appl. No.: 18/776,219

(22) Filed: Jul. 17, 2024

(65) Prior Publication Data

US 2025/0044463 A1 Feb. 6, 2025

(30) Foreign Application Priority Data

Aug. 1, 2023 (KR) ........................ 10-2023-0100678

(51) Int. Cl.
*G01S 19/48* (2010.01)
*B64U 20/87* (2023.01)
(Continued)

(52) U.S. Cl.
CPC ............ *G01S 19/485* (2020.05); *B64U 20/87* (2023.01); *G06V 20/17* (2022.01); *B64U 2101/32* (2023.01)

(58) Field of Classification Search
CPC ....... G01S 19/485; G06V 20/17; G01C 11/02; G01C 15/002; G01C 15/06; G01C 21/20;
(Continued)

(56) References Cited

U.S. PATENT DOCUMENTS 9,523,575 B2 * 12/2016 Kumagai ............ G01C 15/004
2018/0204469 A1 * 7/2018 Moster .................. B64U 10/13
(Continued)

FOREIGN PATENT DOCUMENTS

KR 1020220080957 A 6/2022

*Primary Examiner* — Aniss Chad
*Assistant Examiner* — Christine Nguyen Huynh
(74) *Attorney, Agent, or Firm* — ZION IP; Byungwoong Park

(57) ABSTRACT

The present disclosure provides a location information acquisition method of a computing device, including the steps of: acquiring first location information at which an electro-optical topographic surveying device is located in response to a received satellite Global Navigation Satellite System (GNSS) signal; acquiring photography information for positioning of a target object photographed by a drone while the drone is flying in a GNSS shadow area from the drone equipped with a survey prism that reflects light waves from the surveying device; calculating absolute coordinates of the target object corresponding to the surveying device based on reflective metering of the survey prism and the photography information for positioning; and calculating GNSS based second location information as location information of the target object using the absolute coordinates and the first location information.

11 Claims, 12 Drawing Sheets

(51) Int. Cl.
*B64U 101/32* (2023.01)
*G06V 20/17* (2022.01)

(58) Field of Classification Search
CPC . B64U 20/87; B64U 2101/32; B64U 2101/30
See application file for complete search history.

(56) References Cited

U.S. PATENT DOCUMENTS

2018/0224276 A1* 8/2018 Nishita .................. H04N 7/185
2019/0073794 A1* 3/2019 Sasaki ....................... G06T 7/75
2020/0342622 A1* 10/2020 Takeuchi ............. G01C 15/002

* cited by examiner

200

Figure 5:
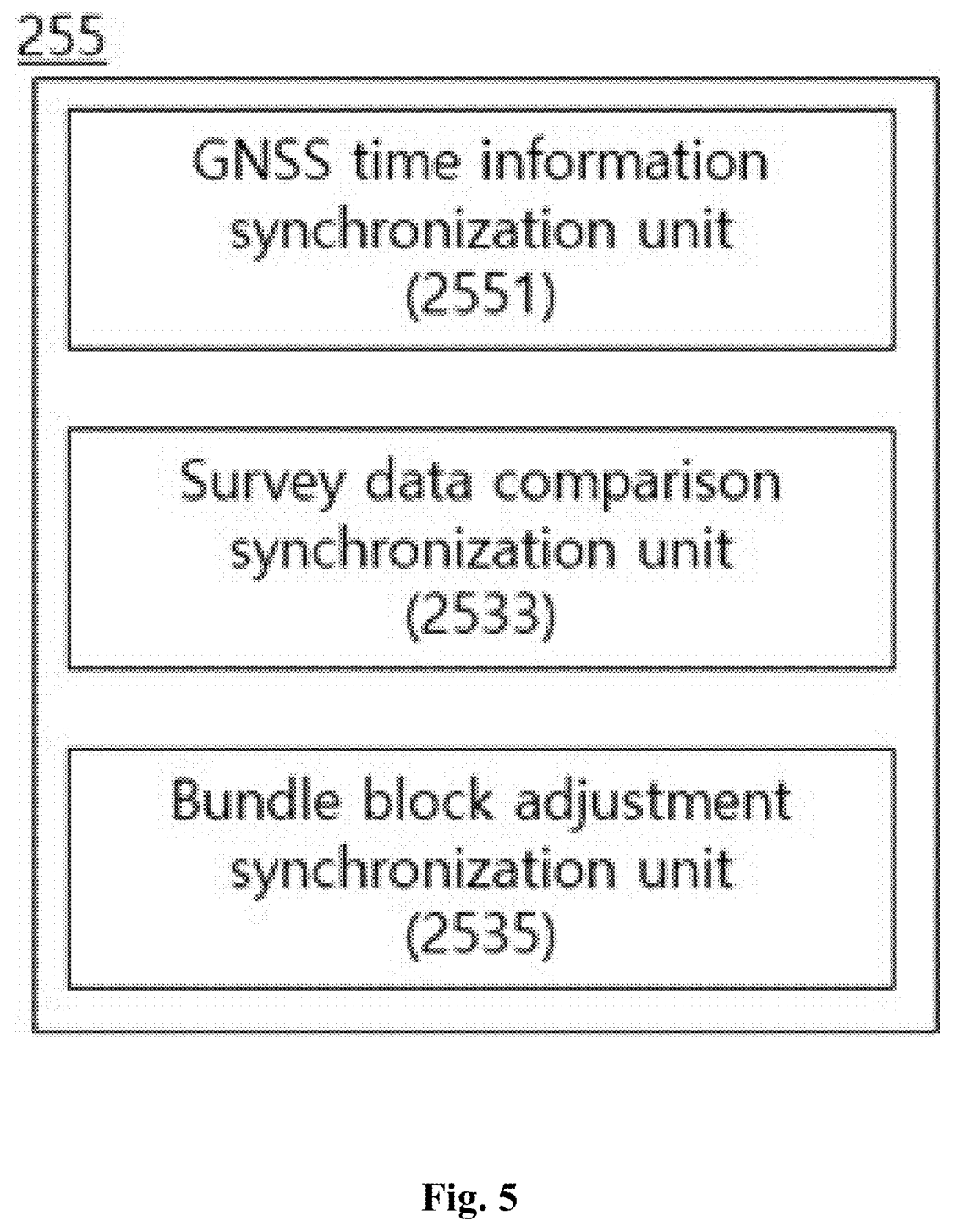

255

GNSS time information synchronization unit (2551)

Survey data comparison synchronization unit (2533)

Bundle block adjustment synchronization unit (2535)

Grey zone identification unit (2531)

Relative location change movement control unit (2533)

Fig. 7

METHOD AND APPARATUS FOR LOCATION INFORMATION ACQUISITION IN GNSS SHADOW AREA USING DRONES INCLUDING PRISM

BACKGROUND

Technical Field

Embodiments of the present disclosure relate to a location information acquisition method and apparatus, and more particularly, to location information acquisition in global navigation satellite system (GNSS) shadow areas.

Background Art

Global Navigation Satellite System (GNSS) is a technique that determines location information of a receiver based on information received from satellites. GNSS systems include, for example, USA's Global Positioning System (GPS), Russia's GLONASS, European Union's Galileo, China's Beidou, Japan's Quasi-Zenith Satellite System (QZSS), India's Indian Regional Navigation Satellite System (IRNSS), etc. Because GNSS uses information received from satellites, it is difficult to determine the location of the receiver in GNSS shadow areas having an obstructed Line of Sight (LOS) to the satellites such as underground facilities. As a consequence, it is difficult to provide accurate location information indoors using GNSS.

For example, when acquiring indoor location information in construction or surveying under the ground or in tunnels, it is impossible to achieve accurate indoor surveying based on GNSS due to GNSS signal blockage.

Meanwhile, an electro-optical surveying instrument called a total station or a total solution may directly measure the absolute coordinates of an observed point by mounting GNSS on the instrument, and it can be used to acquire the absolute coordinates of the target location without a GNSS signal by collimating a prism installed to reflect light waves, thereby building a GNSS based indoor surveying system in the design of underground facilities or tunnels where GNSS is unavailable.

However, the prism-aided method has an inconvenience of having to pre-install each prism for reflection at each desired location, and is unavailable especially at parts of tunnels that are not straight or where there are obstacles, making electro-optical measurement impossible.

SUMMARY

The present disclosure is designed to solve the above-described problems, and therefore the present disclosure is directed to providing a location information acquisition method and apparatus for measuring a relative distance from an electro-optical topographic surveying device using a drone equipped with a prism while it is moving in buildings or tunnels or under the ground, thereby achieving global navigation satellite system (GNSS) information based surveying in GNSS shadow areas without placing the prism at a fixed location, and GNSS information based surveying through location estimation in areas that are blocked by obstacles or curved tunnels.

The technical problems to be solved by the present disclosure are not limited to the aforementioned problems, and can be extended to many other problems derived from the embodiments of the present disclosure as described below.

To solve the above-described problems, a location information acquisition method of a computing device according to an embodiment of the present disclosure includes the steps of acquiring first location information at which an electro-optical device is installed in response to a received satellite Global Navigation Satellite System (GNSS) signal; acquiring photography information for positioning including drone location and camera pose for drone mapping in a target area while the drone is flying in a GNSS shadow area from the drone equipped with a survey prism that reflects light waves from the surveying device; calculating absolute coordinates of the target object corresponding to the surveying device based on reflective metering of the survey prism and the photography information for positioning; and calculating GNSS based second location information as location information of the target object using the absolute coordinates and the first location information.

Additionally, to solve the above-described problems, the method according to an embodiment of the present disclosure may be implemented in a computer program stored in a computer-readable medium to enable a computer to perform the method.

Additionally, to solve the above-described problems, a computing device according to an embodiment of the present disclosure includes a first location information acquisition unit configured to acquire first location information at which an electro-optical surveying device is installed in response to a received satellite GNSS signal; an absolute coordinate calculation unit configured to receive photography information for positioning including drone location and camera pose for drone mapping in a target area, acquired while the drone is flying in a GNSS shadow area from the drone equipped with a survey prism that reflects light waves from the surveying device, and calculate absolute coordinates of a target object corresponding to the surveying device based on reflective metering of the survey prism and the photography information for positioning; and a second location information calculation unit configured to calculate GNSS based second location information as location information of the target object using the absolute coordinates and the first location information.

According to the embodiments of the present disclosure, the absolute coordinates may be calculated using the photography information for positioning of the target object photographed by the drone while it is flying in the global navigation satellite system (GNSS) shadow area and reflective metering of the survey prism from the drone equipped with the survey prism that reflects light waves from the electro-optical topographic surveying device, and GNSS based location information of the target object may be accurately calculated using the absolute coordinates without any additional GNSS signal.

Accordingly, the present disclosure may achieve GNSS information based surveying in the GNSS shadow area without placing the prism at a fixed location by moving the drone equipped with the prism in buildings or tunnels or under the ground.

Additionally, the present disclosure may provide the location information acquisition method and apparatus for GNSS information based surveying in areas that are blocked by obstacles or curved tunnels by using drone location estimation using the drone equipped with the prism.

It should be understood that the effects of the present disclosure are not limited to the aforementioned effects, and can be extended to many other effects derived from the detailed description of the embodiments of the present disclosure as below.

BRIEF DESCRIPTION OF THE DRAWINGS

FIG. 5 is a block diagram detailing an absolute coordinate calculation unit according to an embodiment of the present disclosure.

FIGS. 6 and 7 is a block diagram detailing an embodiment of relative location change control of a drone operation unit according to an embodiment of the present disclosure.

DETAILED DESCRIPTION OF EXEMPLARY EMBODIMENTS

Hereinafter, embodiments of the present disclosure will be described in detail with reference to the accompanying drawings.

Figure 1:
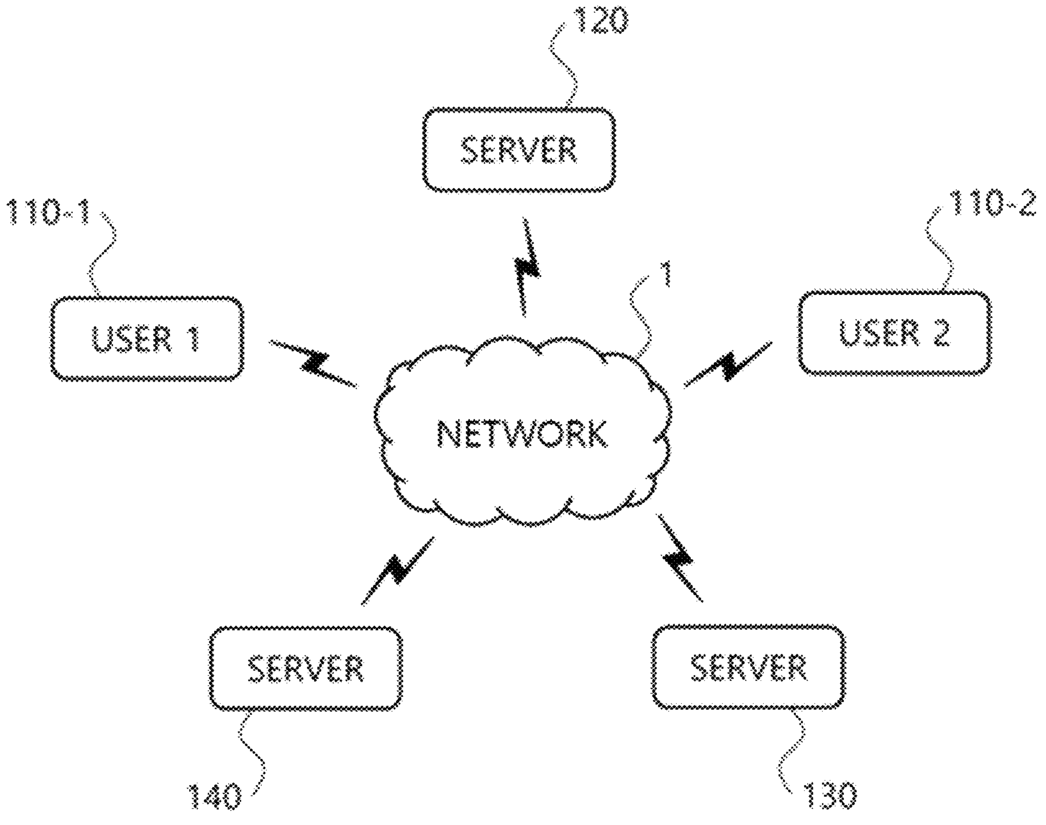
FIG. 1 is a diagram showing an example of a working environment of a system according to an embodiment of the present disclosure.

FIG. 1 is a diagram showing an example of a working environment of a system according to an embodiment of the present disclosure. Referring to FIG. 1, a user device 110 and one or more servers 120, 130, 140 are connected via a network 1. FIG. 1 is provided by way of example, and the number of user devices or servers is not limited thereto.

The user device 110 may be a fixed or mobile terminal implemented as a computer system. The user device 110 may include, for example, a smart phone, a mobile phone, a navigation, a computer, a laptop computer, a digital broadcasting terminal, a Personal Digital Assistant (PDA), a Portable Multimedia Player (PMP), a tablet PC, a game console, a wearable device, an internet of things (IoT) device, a virtual reality (VR) device and an augmented reality (AR) device. For example, in the embodiments, the user device 110 may refer to, in substance, one of a variety of physical computer systems that can communicate with the servers 120-140 via the network 1 using a wireless or wired communication method.

Each server may be implemented as a computer device or a plurality of computer devices which provide instructions, code, files, content and services by communication with the user device 110 via the network 1. For example, the server may be a system which provides each service to the user device 110 connected via the network 1. As a more specific example, through an application as a computer program installed and running on the user device 110, the server may provide the user device 110 with a service (for example, information provision, etc.) intended by the corresponding application. As another example, the server may distribute files for installing and running the above-described application to the user device 110, receive user input information and provide a corresponding service.

Figure 2:
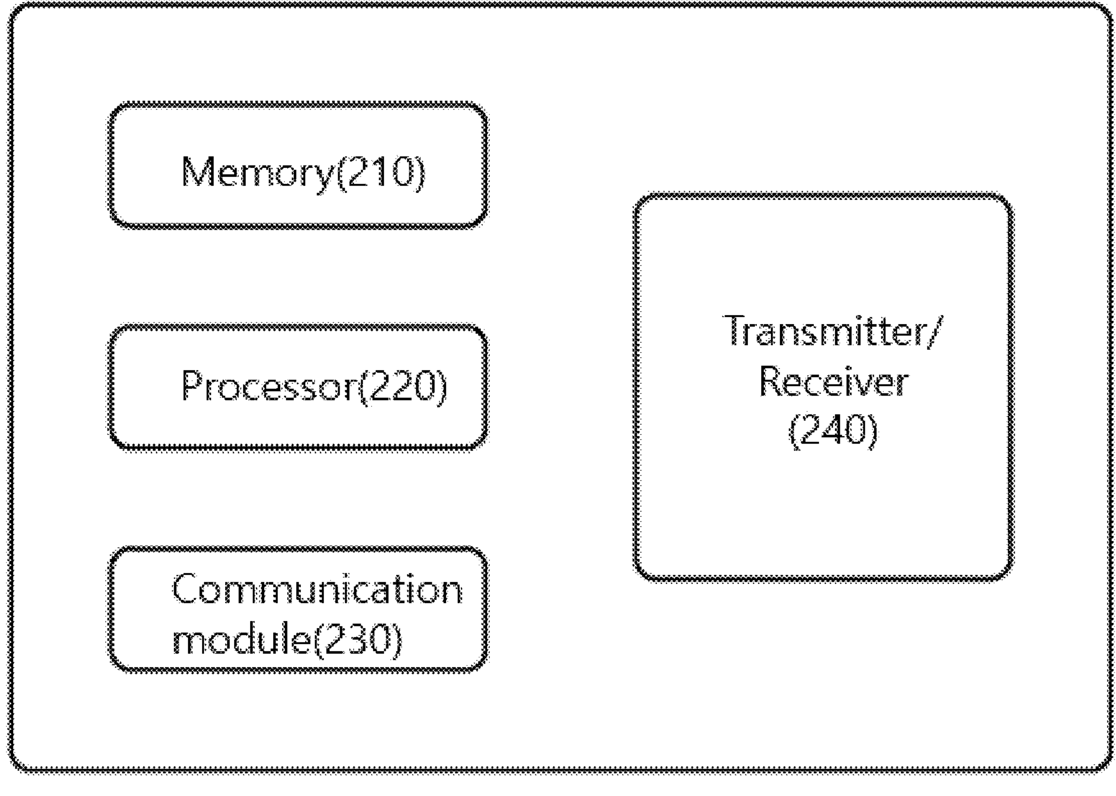
FIG. 2 is a block diagram illustrating the internal configuration of a computing device 200 in an embodiment of the present disclosure.

FIG. 2 is a block diagram illustrating the internal configuration of a computing device 200 in an embodiment of the present disclosure. The computing device 200 may be applied to the user device 110 or the servers 120-140 described above with reference to FIG. 1, and each device and the servers may have identical or similar internal configuration by adding or subtracting some components.

Referring to FIG. 2, the computing device 200 may include a memory 210, a processor 220, a communication module 230 and a transmitter/receiver 240. The memory 210 is a non-transitory computer-readable recording medium, and may include a permanent mass storage device such as random access memory (RAM), read only memory (ROM), disk drive, solid state drive (SSD) and flash memory. Here, the permanent mass storage device such as ROM, SSD, flash memory and disk drive is a separate permanent storage device that is different from the memory 210 and may be included in the above-described device or server. Additionally, the memory 210 may store an operating system and at least one program code (for example, code for browsers installed and running on the user device 110 or applications installed on the user device 110 to provide particular services). These software components may be loaded from a separate computer-readable recording medium that is different from the memory 210. The separate computer-readable recording medium may include a computer-readable recording medium such as floppy drive, disk, tape, DVD/CD-ROM drive and a memory card.

In another embodiment, the software components may be loaded onto the memory 210 through the communication module 230, but not the computer-readable recording medium. For example, at least one program may be loaded onto the memory 210 based on a computer program (for example, the above-described application) installed by files provided by developers or a file distribution system (for example, the above-described server) responsible for distributing an installation file of the application via the network 1.

The processor 220 may be configured to process the instructions of the computer program by performing basic operations such as arithmetic, logic and input/output operations. The instructions may be provided to the processor 220 by the memory 210 or the communication module 230. For example, the processor 220 may be configured to execute the received instructions according to the program code stored in the recording device such as the memory 210.

The communication module 230 may provide a function of allowing the user device 110 and the servers 120-140 to communicate with each other via the network 1, and a function of allowing each of the device 110 and/or the servers 120-140 to communicate with another electronic device.

The transmitter/receiver 240 may be a means for interfacing with an external input/output device (not shown). For example, the external input device may include a keyboard, a mouse, a microphone and a camera, and the external output device may include a display, a speaker and a haptic feedback device.

As another example, the transmitter/receiver 240 may be a means for interfacing with a device having an integrated function for input and output such as a touchscreen.

Additionally, in other embodiments, the computing device 200 may include a larger number of components than the components of FIG. 2 according to the nature of a device to which the computing device 200 is applied. For example, when the computing device 200 is applied to the user device 110, the computing device 200 may be implemented to include at least some of the above-described input/output devices, or may further include other components such as a transceiver, a Global Navigation Satellite System (GNSS)

module, a camera, a variety of sensors and a database. As a more specific example, when the user device is a smartphone, the computing device 200 may be implemented to further include various types of components commonly included in smartphones, such as an acceleration sensor or a gyro sensor, a camera module, a variety of physical buttons, buttons using a touch panel, input/output ports and a vibrator for vibration.

The following description will be made based on the computing device that operates based on FIGS. 1 and 2. As an example, in the following description, a user may communicate with an electro-optical topographic surveying device 300 based on the computing device 200. Additionally, in the following description, the electro-optical topographic surveying device 300 may be a device that is connected to the computing device 200 and communicates with an external device. As a specific example, the electro-optical topographic surveying device 300 may communicate with another device or server via the network, and may include the components included in the computing device 200 of FIG. 2.

Figure 3:
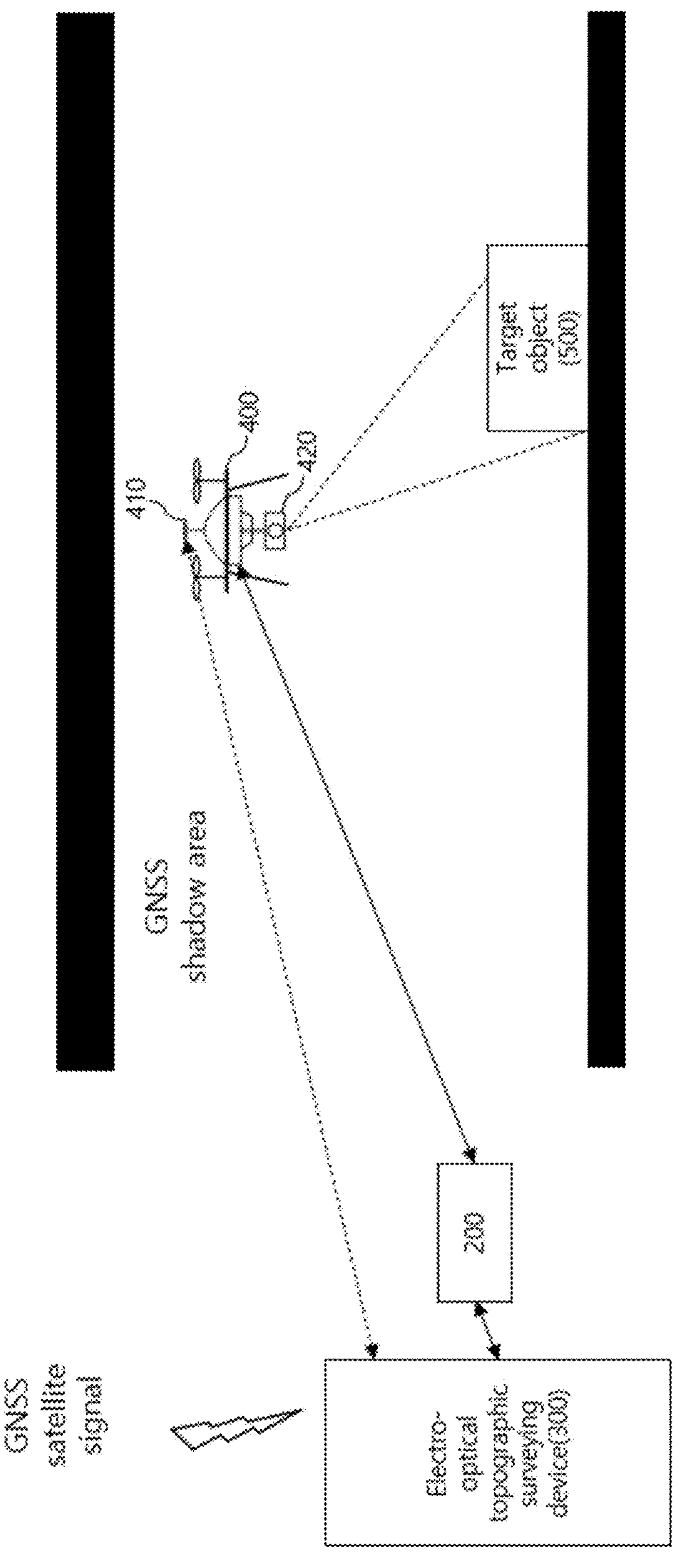
FIG. 3 is a schematic conceptual diagram showing a surveying environment and a system according to an embodiment of the present disclosure.

FIG. 3 is a conceptual diagram showing a surveying environment and a system according to an embodiment of the present disclosure.

Referring to FIG. 3, the electro-optical topographic surveying device 300 may include GNSS information based surveying instrument known as a total station. The surveying device 300 is an instrument for GNSS surveying using electro-optical measurement, and may include an electronic distance and angle meter by combining an electronic theodolite and electro-optical instruments (EDM) into a single instrument. Although not shown, it may generally include a vertical angle detector to measure a vertical angle formed by up-down movement of a telescope, a horizontal angle detector to measure a horizontal angle formed by left-right rotation of the body, a distance measurement unit to measure a distance from the center of the body to a survey prism and a tilting sensor to measure and correct the horizon of the body.

Additionally, survey result data of the surveying device 300 includes GNSS information based data according to the format of an operating system program and an application program executed by the operation of the computing device 200, and may be converted to different formats and survey modes for each survey and measurement value processing.

Additionally, the surveying device 300 generally determines angle and distance-based data on the basis of GNSS coordinates of the surveying device 300 as location information of a target object 500, so it is generally possible to achieve GNSS based surveying in tunnels or cavities without an additional GNSS signal by installing a prism.

However, as described above, it takes a lot of time and costs to move or install the prism each time for each desired location, and there is a constraint that there is no obstacle between the prism and the surveying device 300. The computing device 200 according to an embodiment of the present disclosure uses a drone 400 equipped with a survey prism 410 to solve these problems, and calculate a GNSS based location of the target object 500, thereby removing the inconvenience of having to install or move the prism, and further, proposes a computation method of the computing device 200 for estimating the location of the target object 500 by location estimation of the drone 400 in the presence of an obstacle.

To this end, the survey prism 410 equipped in the drone 400 may be formed in the shape of a prism to allow for reflection of light at 360° in all directions by collimation (including field of view control and light source emission) of the surveying device 300, so that incident light is diffused with light intensity that decrease at a predetermined ratio according to the relative distance and the reflected light is directed towards the surveying device 300.

The survey prism 410 may be attached to a specific location of the drone 400. For example, the specific location may correspond to any one of a top, a bottom or a side of the drone.

Referring to FIG. 3, in the drone based surveying system, first, the electro-optical topographic surveying device 300 may directly receive a GNSS satellite signal to directly acquire GNSS based geographic coordinate information.

Additionally, the computing device 200 may wirelessly control the drone 400 to move to the target object 500 and identify and capture the target object 500 through a camera 420 attached to the drone 400. At the same time as the photographing time, the electro-optical topographic surveying device 300 may acquire a light reflection signal from the survey prism 410 equipped in the drone 400, and calculate GNSS based absolute coordinates of the drone 400.

Accordingly, the computing device 200 may calculate the actual GNSS coordinates of the target object 500 using the GNSS coordinate information of the surveying device 300 and absolute location calculation of the drone 400, thereby easily creating indoor or tunnel map data in GNSS shadow areas through integrated processing of location mapping of photography image and survey data.

Here, the target object 500 may include a particular facility or a particular region, and the drone 400 may transmit the photography information for positioning acquired for location mapping of the target object 500 to the computing device 200, and the photography information for positioning may include, for example, photography image information, photographing time information, camera pose information and movement path information.

Hereinafter, an embodiment of the present disclosure will be described in more detail based on the configuration and operation of the computing device 200 for calculating the location information of the target object based on the drone.

Figure 4:
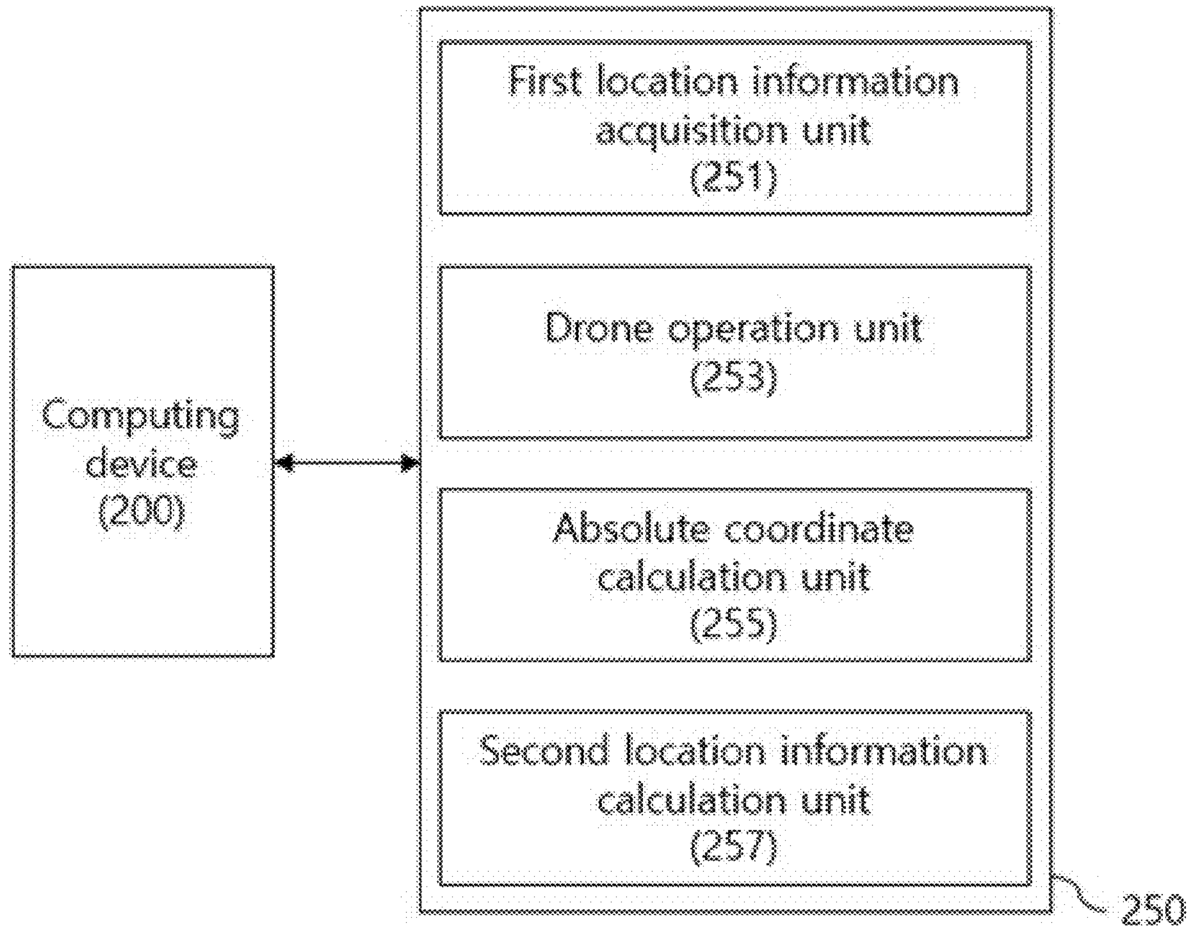
FIG. 4 is a block diagram detailing a service processing unit according to an embodiment of the present disclosure.

FIG. 4 is a block diagram detailing a service processing unit according to an embodiment of the present disclosure, and FIG. 5 is a block diagram detailing an absolute coordinate calculation unit according to an embodiment of the present disclosure.

Referring to FIG. 4, the computing device 200 according to an embodiment of the present disclosure may further include the service processing unit 250. The service processing unit 250 may include processor modules to perform a variety of service processes for data processing according to an embodiment of the present disclosure among the logic and input/output operations processed by the processor 220. The computing device 200 may perform service processing using the processed data from the service processing unit 250 included in the processor 220 or the service processing unit 250 equipped as an external processor, and provide the generated service processing result to the user device 110 or one or more servers 120, 130, 140.

By this processing, the user device 110 or one or more servers 120, 130, 140 may receive the processed data by the operation of the service processing unit 250 according to an embodiment of the present disclosure and display and output the data through the display device, or transmit and receive the data via an external network.

More specifically, first, referring to FIG. 4, the service processing unit 250 includes a first location information acquisition unit 251, a drone operation unit 253, the absolute coordinate calculation unit 255 and a second location information calculation unit 257.

The first location information acquisition unit 251 acquires first location information at which the surveying device 300 is located when the surveying device 300 receives a satellite GNSS signal. Here, the first location information is GNSS based coordinate information, and the surveying device 300 is preferably disposed at a specific outdoor location adjacent to the GNSS shadow area to capture an indoor image of the GNSS shadow area.

Additionally, the drone operation unit 253 performs flight and photography control to control the drone 400 to capture an image of the target object 500 while it is flying in the GNSS shadow area. Here, the drone operation unit 253 may apply a photographing signal through the control of the camera 420 of the drone 400, and transmit, to the absolute coordinate calculation unit 255, a photography image or an orthomosaic image as photography information for positioning of the target object 500 of which image is captured in response to the photographing signal. However, in an embodiment of the present disclosure, the photography information for positioning is not limited to the image, and the photography information for positioning may further include photographing time information, camera pose information and movement path information.

Accordingly, the absolute coordinate calculation unit 255 calculates the absolute coordinates of the drone 400 corresponding to the surveying device 300 using the photography information for positioning of the target object photographed by the drone 400 while it is flying in the GNSS shadow area, and reflective metering information of the survey prism acquired from the surveying device 300.

Additionally, the second location information calculation unit 257 may calculate GNSS based second location information as location information of the target object 500 using the absolute coordinates and the first location information. The calculated second location information may be provided to the surveying device 300, or may be inputted to a geographic system together with the photography information for positioning to create GNSS information based map data such as indoors or tunnels.

Here, in addition to the photography image or the orthomosaic image, the photography information for positioning for the absolute coordinate calculation of the absolute coordinate calculation unit 255 may further include photographing location information, camera pose information and photographing time information as described above.

In particular, when there is a beacon (not shown) to determine location information in the GNSS shadow area, the photography information for positioning may further include detailed photographing location information identified by communication with the drone 400. In this case, the absolute coordinate calculation unit 255 may calculate more accurate location information by applying the detailed photographing location information as a correction value of the absolute coordinate calculation of the surveying device 300.

Additionally, in the case of the above-described photographing time information, there may be a time error between the drone 400 system and the surveying device 300 system, causing an error in the time at which the surveying device 300 acquires the location data from light reflection of the prism 410 and the photographing time information. Here, because the photographing time is processed as survey data acquisition time, in the surveying, it is information requiring accurate time synchronization with the surveying device 300.

Accordingly, referring to FIG. 5, the absolute coordinate calculation unit 255 may further include at least one synchronization unit for error correction of survey data acquisition time, and each synchronization unit may selectively operate according to manager settings.

First, a GNSS time information synchronization unit 2551 may pre-calibrate to synchronize the photographing time information of the drone 400 with the time information of the surveying device 300 on the basis of GNSS reference time. The calibration may be performed beforehand when building the system, and in this case, the time information of the surveying device 300 and the photographing time information of the drone 400 are already synchronized, thereby avoiding an error between the photographing time information and the measurement time of the surveying device 300.

Additionally, when they are unsynchronized, error correction using a survey data comparison synchronization unit 2533 or a bundle block adjustment synchronization unit 2535 may be used.

First, the survey data comparison synchronization unit 2533 may compare first survey data by reflective metering of the survey prism 420 acquired at a preset data acquisition time with second survey data acquired according to the photographing time information, and as a result of the comparison, calculate the absolute coordinates of the drone 400 corresponding to the photography image based on survey information close within the threshold.

More specifically, the survey data comparison synchronization unit 2533 may set a data acquisition cycle to a preset time interval to correct the measurement time error between the drone 400 and the surveying device 300 in which time information is not synchronized.

For example, first, the survey data comparison synchronization unit 2533 may adjust the data acquisition time cycle of the surveying device 300 to 0.5 sec and acquire first survey data by reflective metering of the survey prism 420 at a 0.5 sec interval to form survey data.

Additionally, the survey data comparison synchronization unit 2533 may form photographing data for positioning including second survey data by measuring a coordinate movement between photography images captured by the drone 400.

Accordingly, the survey data comparison synchronization unit 2533 may interpolate the photography based second survey data at a 0.05 second interval, compare the interpolated data with the prism surveying based first survey data, extract survey information close within the threshold, and perform time synchronization processing on the basis of the extracted survey information. Accordingly, the survey data comparison synchronization unit 2533 may calculate the absolute coordinates measured at the photographing time of the target object 500 corresponding to the photography image as survey data by using the synchronized time information.

Meanwhile, the bundle block adjustment synchronization unit 2535 may operate when a plurality of surveying devices 300 is disposed at a plurality of preset locations at which GNSS signals are received.

More specifically, the bundle block adjustment synchronization unit 2535 may form a preset weight matrix table for each location range by bundle block adjustment according to a relative coordinate relationship between the plurality of surveying devices, and perform synchronization correction processing of the photographing time information using the weight matrix table for each location range.

Figure 6:
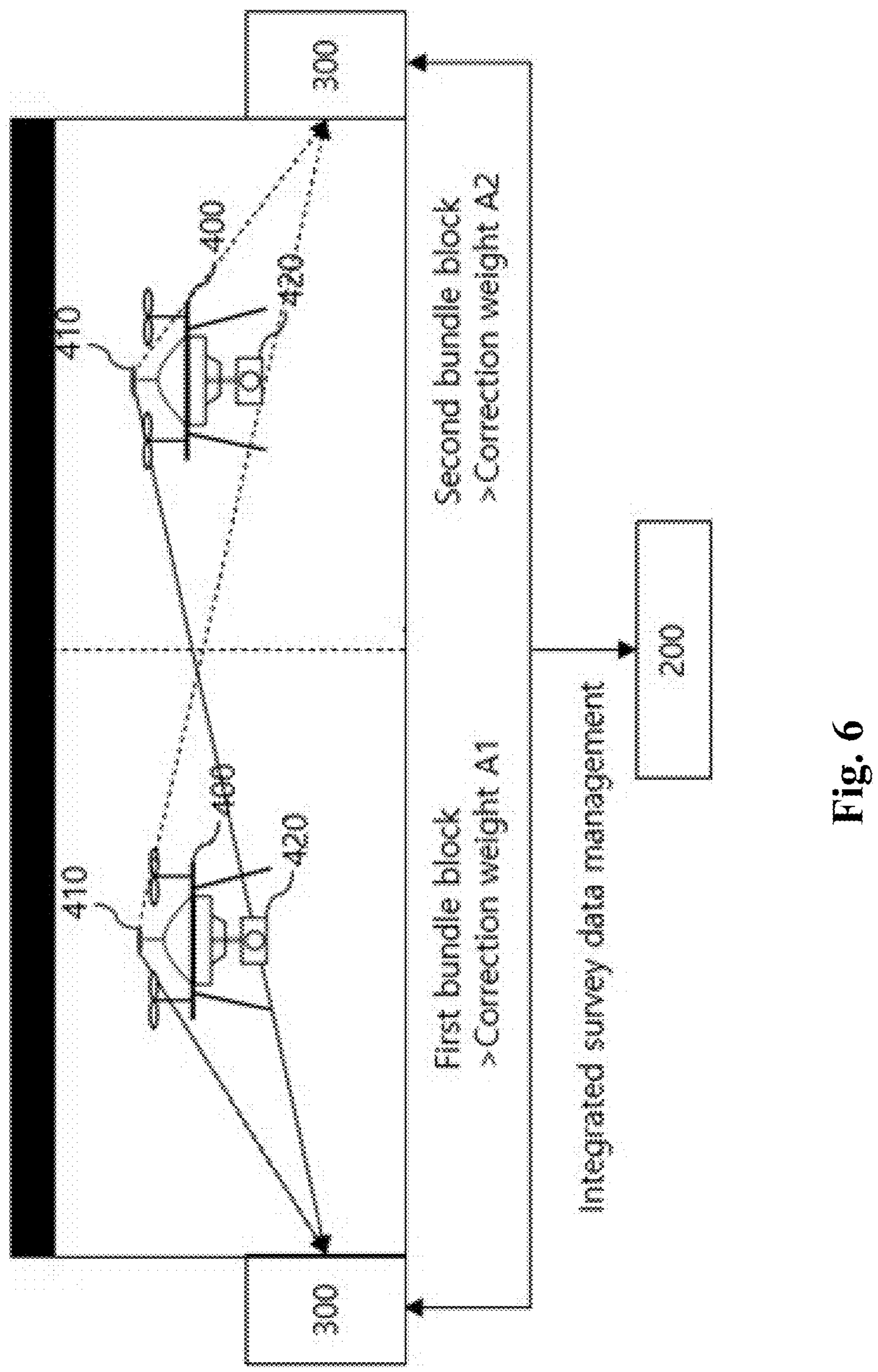

For example, FIG. 6 shows the photographing time correction weight adjustment process according to the weight matrix table for each location range, and when the plurality of surveying devices 300 is disposed, photographing time correction weight adjustment may be processed for each bundle block. The photographing time ultimately indicates the data acquisition time in survey data, and thus accurate time synchronization is required. Accordingly, when the matrix table including weight values is pre-built by performing a complex calculation process beforehand, it may be possible to shorten the relative coordinate relationship calculation process for accurate time synchronization.

Additionally, the computing device 200 may carry out integrated management of survey data of each surveying device 300 and mapping of relative location coordinates to the entire area with respect to a specific reference point as integrated coordinates, thereby achieving more accurate positioning in diverse and complex structures or overlapping connected areas.

Figure 7:
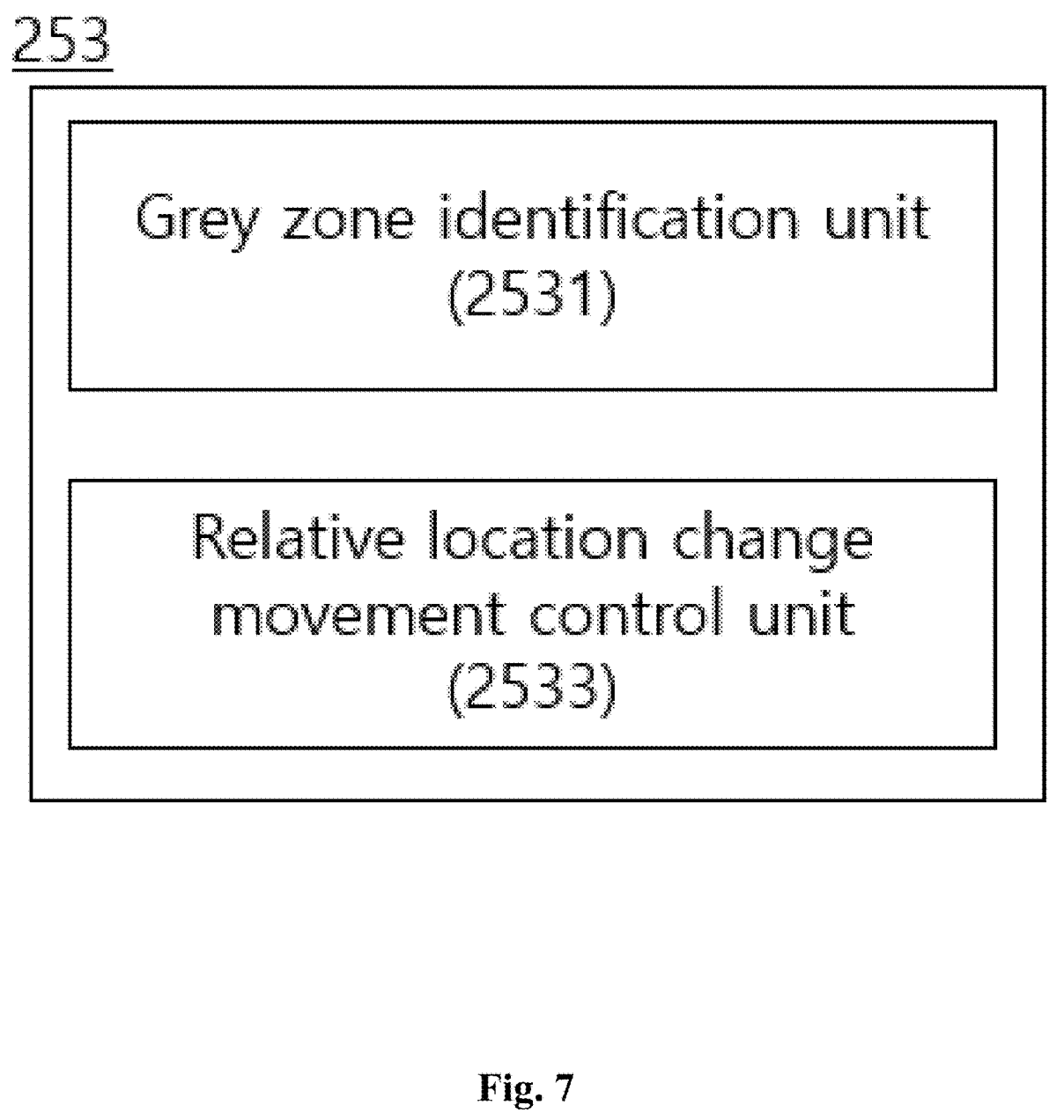

Meanwhile, FIG. 7 is a block diagram detailing an embodiment of relative location change control of the drone operation unit according to an embodiment of the present disclosure, and FIGS. 8 to 11 is a diagram illustrating location estimation with a change in relative location.

Referring to FIG. 7, the drone operation unit 253 according to an embodiment of the present disclosure may further include a grey zone identification unit 2531 and a relative location change movement control unit 2533.

Here, the grey zone identification unit 2531 may identify a grey zone in which the reflective metering strength of the survey prism 420 equipped in the drone 400 is equal to or less than the threshold.

In this case, the relative location change movement control unit 2533 may determine a first point at which the drone 400 is currently located as a reference point, and control the relative location change movement of the drone 400 on the basis of the reference point. Here, the relative location change movement of the drone 400 may be made in a specific pattern set for coordinate estimation, and the movement pattern may be in the shape of a circle, a triangle or a square including the reference point.

Additionally, when the drone 400 makes a pattern movement by the relative location change movement control, the absolute coordinate calculation unit 255 may estimate the absolute coordinates of the target object 500 located at the grey zone using a change in reflective metering strength of the survey prism detected with the relative location change movement of the drone 400.

Figure 8:
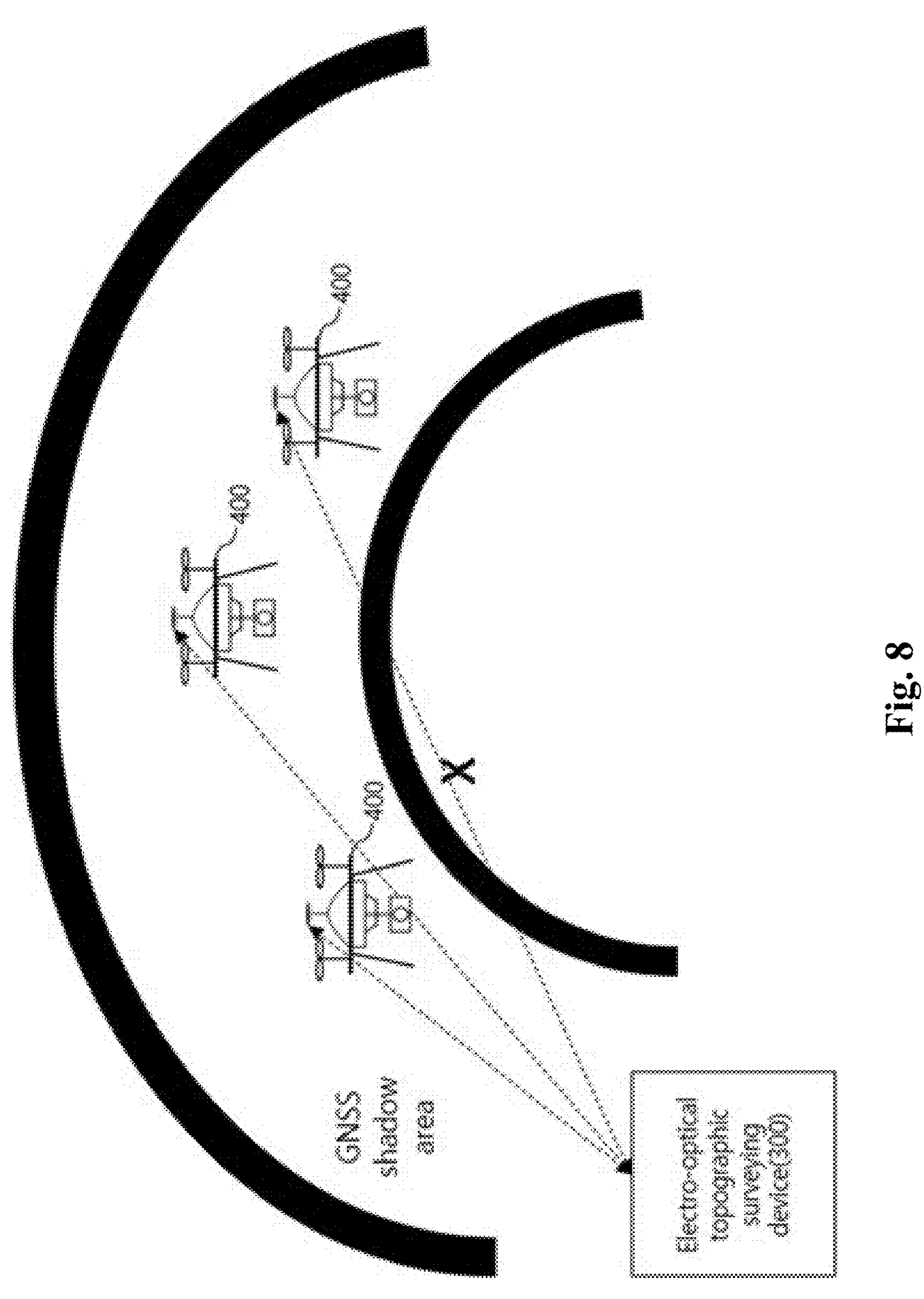
FIGS. 8, 9, 10, and 11 are diagrams illustrating location estimation with a change in relative location.

More specifically, first, referring to FIG. 8, due to the curved shape, in some pieces of the tunnel, the surveying device 300 cannot identify the location of the drone 400 and the prism 420 or the signal strength is low. Accordingly, the grey zone identification unit 2531 may identify that the drone 400 is located at the grey zone.

Figure 9:
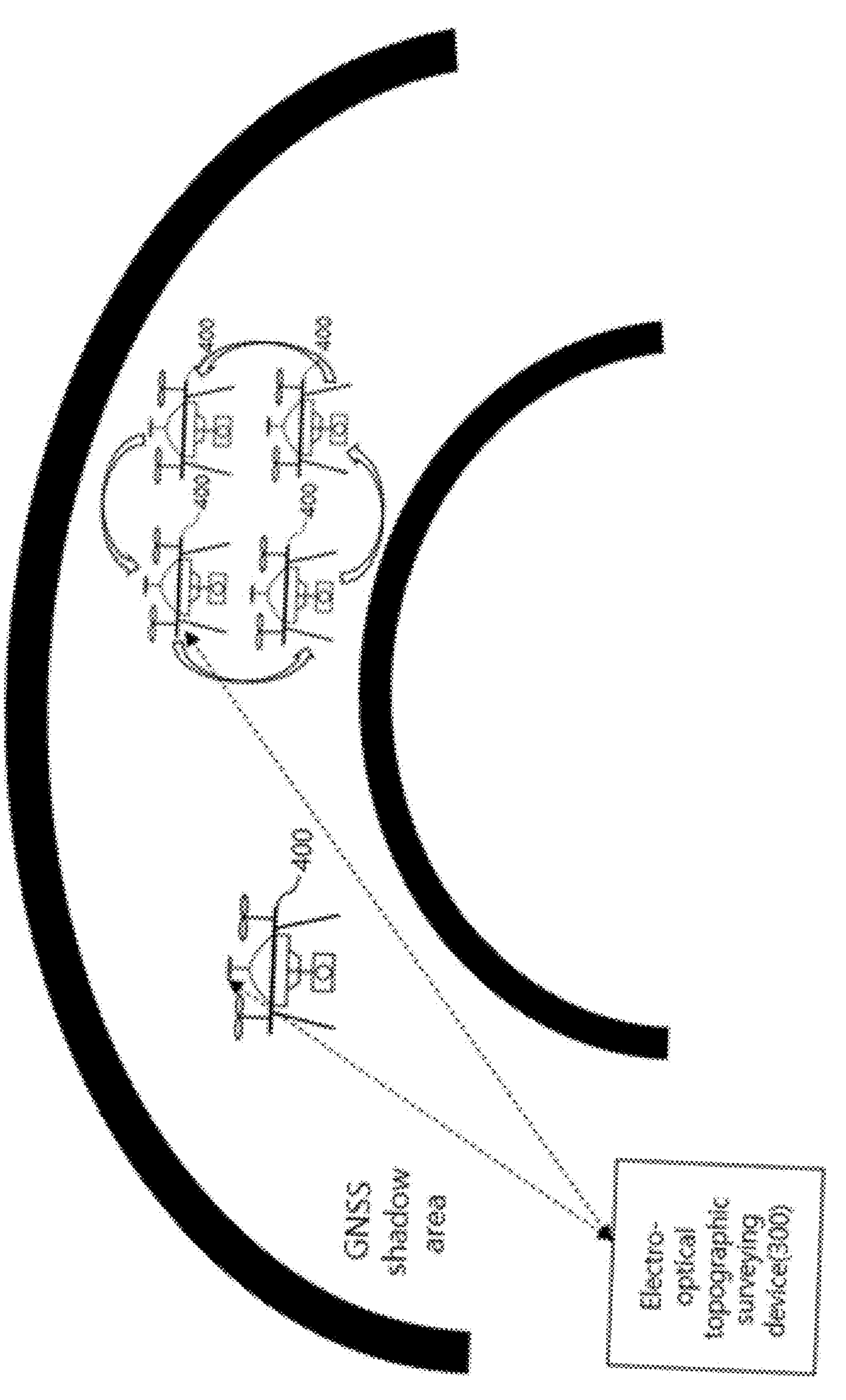

Accordingly, referring to FIG. 9, the relative location change movement control unit 2533 may control a flight operation signal of the drone to move the drone back to a location at which the surveying device 300 can determine the position, and perform the relative location change pattern control on the basis of the finally detected specific location as the reference point. In this case, as shown in FIG. 9, the drone 400 may include the position that can be determined by the surveying device 300, and the position may change depending on the preset flight pattern.

Accordingly, when the drone 400 is repeatedly flying in peripheral areas in which the positioning signal strength of the surveying device 300 is low, the curve location of the grey zone may be identified, and the absolute coordinate calculation unit 255 may estimate and calculate absolute location information using the relative location change information on the basis of the above-described reference point.

Figure 10:
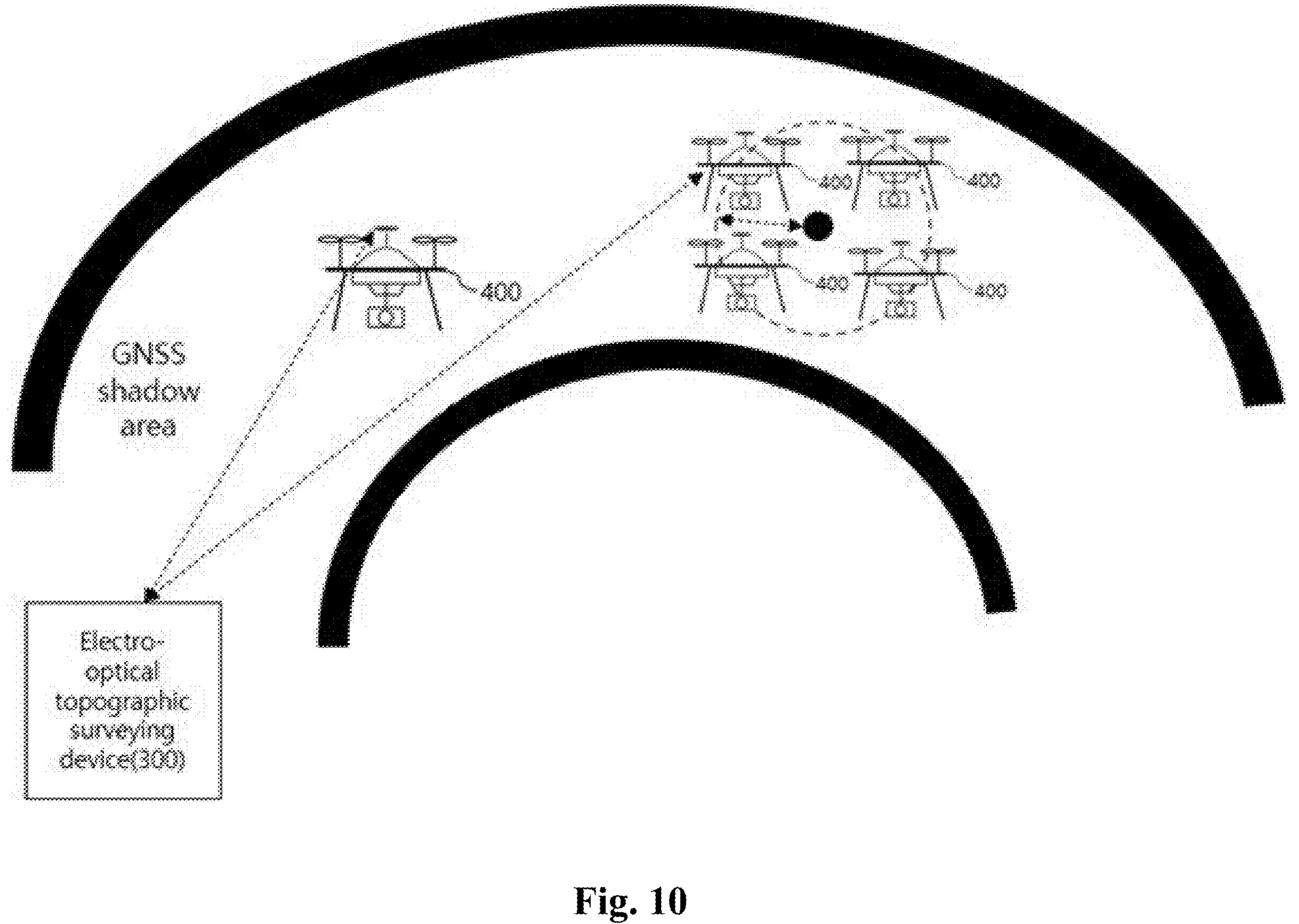

Referring to FIG. 10, a positioning estimation area corresponding to the specific flight pattern may be determined by the relative location change pattern control in the grey zone, and the positioning estimation area may be determined as a center point of the flight pattern, or an estimated point with a difference in the received signal strength from the surveying device 300 in the flight pattern.

Figure 11:
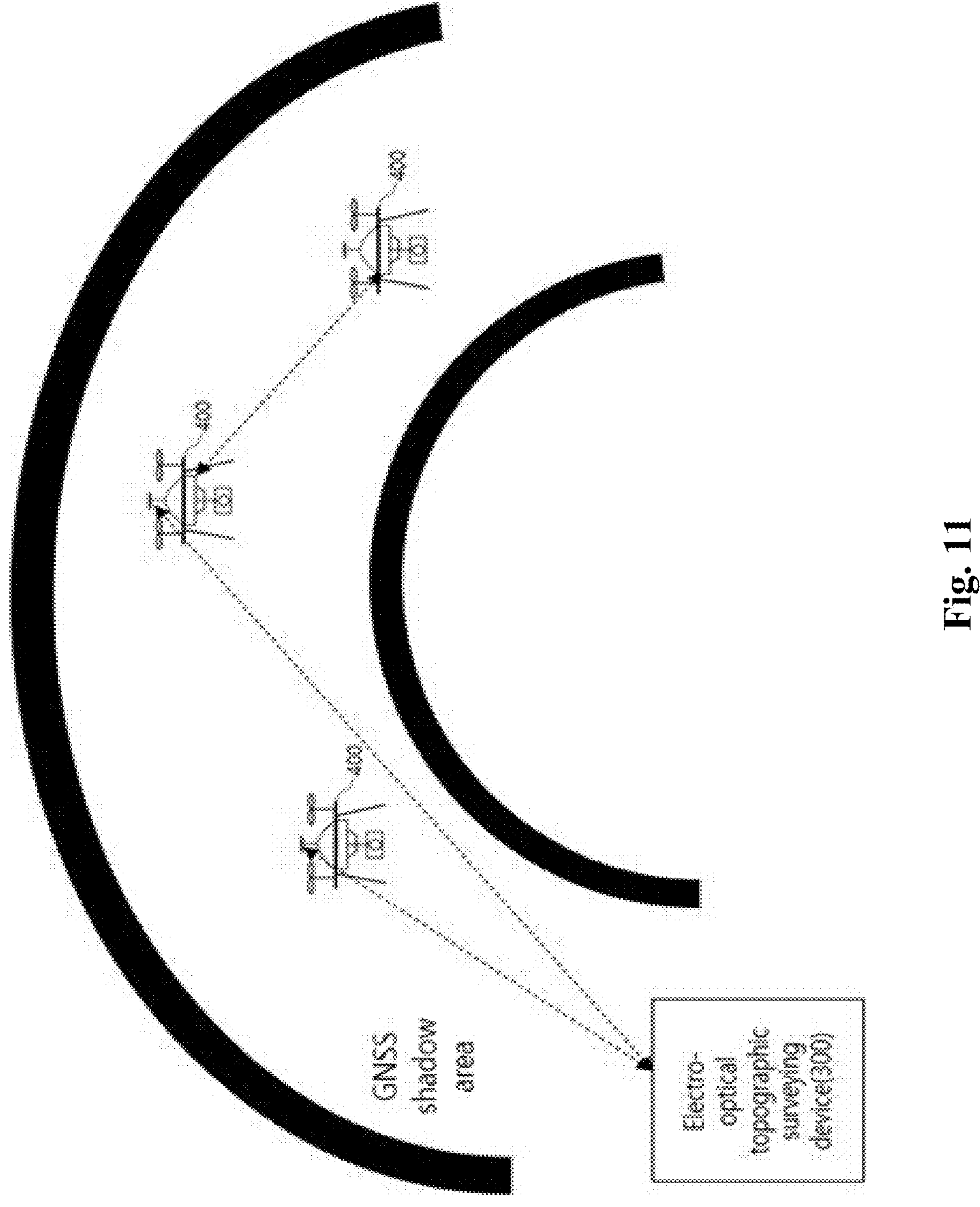

Meanwhile, as shown in FIG. 11, the drone 400 may move so far away that the surveying device 300 cannot track after its location is measured last by the surveying device 300. In this case, the absolute coordinate calculation unit 255 may acquire relative movement distance sensing information of the drone 400 from the drone 400 on the basis of the last measured location. The absolute coordinate calculation unit 255 may estimate and calculate the absolute location information by combining the relative movement distance sensing information with the location information measured last by the surveying device 300. Accordingly, the surveying device 300 may estimate and determine the absolute location of the drone when a light wave signal is unavailable.

Figure 12:
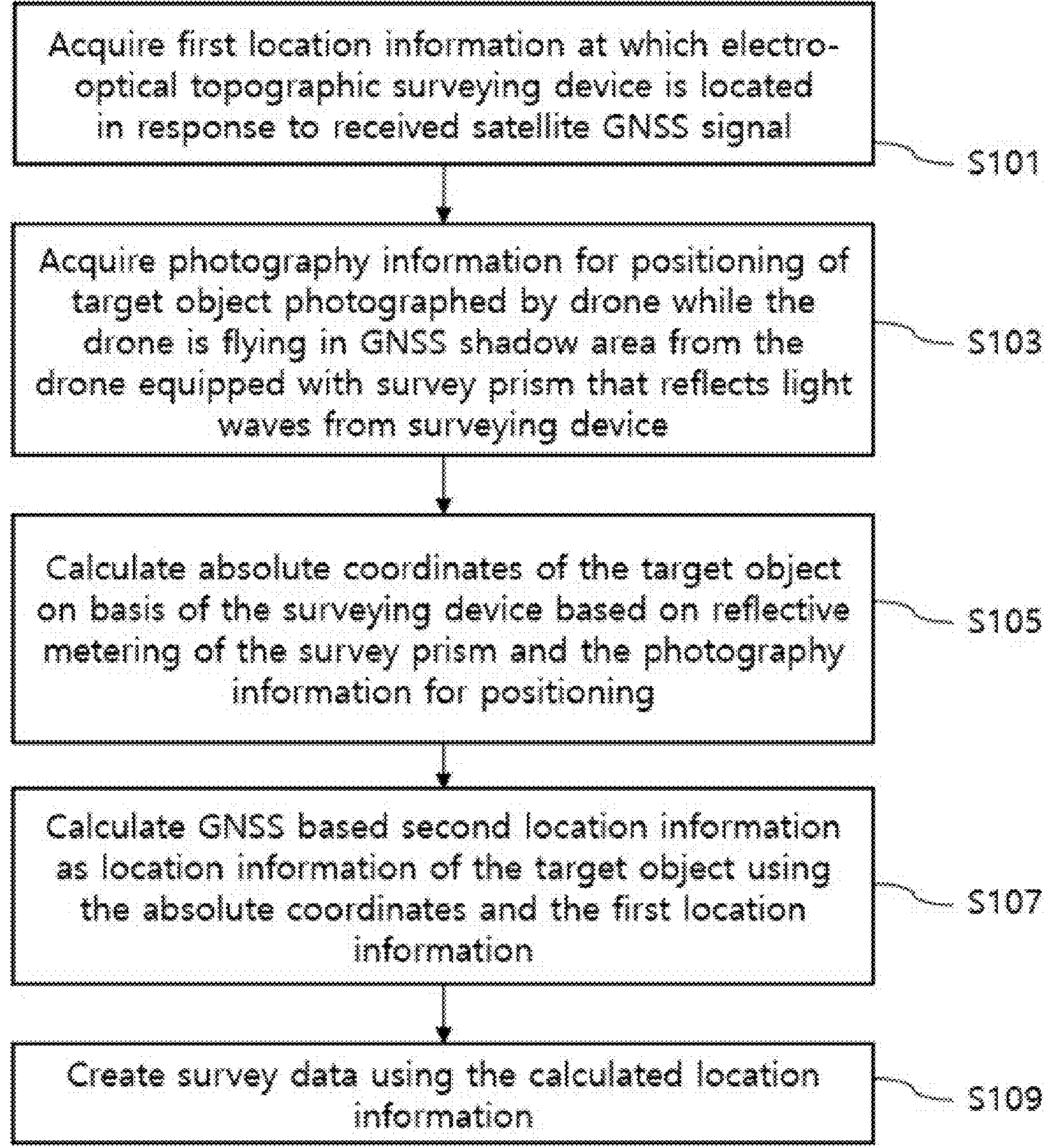
FIG. 12 is a flowchart illustrating the operation of a computing device according to an embodiment of the present disclosure.

FIG. 12 is a flowchart illustrating the operation of the computing device according to an embodiment of the present disclosure.

Referring to FIG. 12, the computing device 200 including the service processing unit 250 according to an embodiment of the present disclosure acquires the first location information at which the electro-optical topographic surveying device 300 is located through the first location information acquisition unit 251, in response to the received GNSS satellite signal (S101).

Additionally, the computing device 200 acquires the photography information for positioning of the target object photographed by the drone 400 while it is flying in the GNSS shadow area from the drone 400 equipped with the survey prism 420 which reflects light waves from the surveying device 300 through the absolute coordinate calculation unit 255 (S103), and calculates the absolute coordinates of the target object on the basis of the surveying device 300 based on the reflective metering of the survey prism 420 and the photography information for positioning (S105).

Subsequently, the computing device 200 calculates the GNSS based second location information as location information of the target object 500 using the absolute coordinates and the first location information of the surveying device 300 through the second location information calculation unit 257 (S107).

Accordingly, the computing device 200 may create survey data indoors or in the tunnel using the calculated location information (109), thereby achieving accurate GNSS surveying based on the drone using the electro-optical prism together with minimizing the installation limitations or obstacle limitations.

The embodiments described hereinabove may be implemented, at least in part, in a computer program and recorded on a computer-readable recording medium. The computer-readable recording medium in which the program for embodying the embodiments is recorded includes any type of recording device in which computer-readable data is stored. Examples of the computer-readable recording medium include ROM, RAM, CD-ROM, magnetic tape, and an optical data storage device. Additionally, the computer-readable recording medium is distributed over computer systems connected via a network, and may store and execute a computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided for illustration purposes only and it will be appreciated by those having ordinary skill in the art that a variety of modifications and variations may be made thereto. However, it should be noted that such modifications fall within the technical protection scope of the present disclosure. Therefore, the true technical protection scope of the present disclosure will be construed as including other implementations, other embodiments and the appended claims and their equivalents by the technical spirit of the appended claims.

What is claimed is:

1. A location information acquisition method of a computing device, comprising the steps of:

acquiring first location information at which an electro-optical topographic surveying device is located in response to a received Global Navigation Satellite System (GNSS) satellite signal;

acquiring photography information for positioning of a target object photographed by a drone while the drone is flying in a GNSS shadow area from the drone equipped with a survey prism that reflects light waves from the surveying device;

calculating absolute coordinates of the drone corresponding to the surveying device based on reflective metering of the survey prism and the photography information for positioning;

calculating GNSS based second location information as location information of the target object using the absolute coordinates and the first location information;

determining a first point at which the drone is currently located as a reference point, and controlling relative location change movement of the drone on the basis of the reference point when a grey zone is identified, the grey zone in which a reflective metering strength of the survey prism is equal to or less than a threshold; and estimating and calculating the absolute coordinates of the drone located at the grey zone using a change in reflective metering strength of the survey prism detected with the relative location change movement of the drone, wherein the photography information for positioning includes at least one of a photography image of the target object or an orthomosaic image using the photography image, the photography information for positioning includes the photography image of the target object and further includes photographing time information corresponding to the photography image, the surveying device includes a plurality of surveying devices disposed at a plurality of preset locations at which GNSS signals are received, the step of calculating the absolute coordinates comprises the step of processing synchronization correction of the photographing time information using a preset weight matrix table for each location range by bundle block adjustment according to a relative coordinate relationship between the plurality of surveying devices, the preset weight matrix table comprises pre-calculated weight values for each bundle block, and the photographing time is a data acquisition time of survey data, and the data acquisition time is corrected based on the pre-calculated weight values.

2. The location information acquisition method of the computing device according to claim 1, wherein the survey prism is formed to allow for reflection of light at 360° in all directions by collimation of the surveying device, and is attached to a specific location of the drone.

3. The location information acquisition method of the computing device according to claim 2, wherein the specific location corresponds to any one of a top, a bottom or a side of the drone.

4. The location information acquisition method of the computing device according to claim 1, wherein the photography information for positioning includes the photography image of the target object and further includes photographing time information corresponding to the photography image, and wherein the photographing time information includes GNSS based time information synchronized with GNSS time information of the surveying device.

5. The location information acquisition method of the computing device according to claim 1, wherein the photography information for positioning includes the photography image of the target object and further includes photographing time information corresponding to the photography image, and the photographing time information is unsynchronized with the surveying device, and wherein the step of calculating the absolute coordinates comprises the steps of:

comparing first survey data by the reflective metering of the survey prism acquired at a preset data acquisition time, with second survey data acquired according to the photographing time information; and calculating the absolute coordinates corresponding to the photography image based on survey information close within a threshold as a result of the comparison.

6. A non-transitory computer readable recording medium storing computer program to enable a computer to perform the method of claim 1.

7. A computing device comprising:

a processor; and one or more memory devices communicatively coupled to the processor, wherein the one or more memory devices stores instructions operable when executed by the processor to perform the steps of:

acquiring first location information at which an electro-optical topographic surveying device is located in response to a received satellite Global Navigation Satellite System (GNSS) signal;

acquiring photography information for positioning of a target object photographed by a drone while the drone is flying in a GNSS shadow area from the drone equipped with a survey prism that reflects light waves from the surveying device, and calculate absolute coordinates of the drone corresponding to the surveying device based on reflective metering of the survey prism and the photography information for positioning;

calculating GNSS based second location information as location information of the target object using the absolute coordinates and the first location information;

determining a first point at which the drone is currently located as a reference point, and controlling relative location change movement of the drone on the basis of the reference point when a grey zone is identified, the grey zone in which a reflective metering strength of the survey prism is equal to or less than a threshold; and estimating and calculating the absolute coordinates of the drone located at the grey zone using a change in reflective metering strength of the survey prism detected with the relative location change movement of the drone, wherein the photography information for positioning further includes photographing time information, the surveying device includes a plurality of surveying devices disposed at a plurality of preset locations at which GNSS signals are received, and the one or more memory devices stores instructions operable when executed by the processor to further perform processing synchronization correction of the photographing time information using a preset weight matrix table for each location range by bundle block adjustment according to a relative coordinate relationship between the plurality of surveying devices, the preset weight matrix table comprises pre-calculated weight values for each bundle block, and the photographing time is a data acquisition time of survey data, and the data acquisition time is corrected based on the pre-calculated weight values.

8. The computing device according to claim 7, wherein the survey prism is formed to allow for reflection of light at 360° in all directions by collimation of the surveying device, and is attached to a specific location of the drone, and wherein the specific location corresponds to any one of a top, a bottom or a side of the drone.

9. The computing device according to claim 7, wherein the photography information for positioning includes at least one of a photography image of the target object or an orthomosaic image formed based on the photography image.

10. The computing device according to claim 9, wherein the photography information for positioning further includes photographing time information, and wherein the photographing time information includes GNSS based time information synchronized with GNSS time information of the surveying device.

11. The computing device according to claim 9, wherein the photography information for positioning further includes photographing time information, and the photographing time information is unsynchronized with the surveying device, and wherein the one or more memory devices stores instructions operable when executed by the processor to further perform comparing a plurality of first survey data by the reflective metering of the survey prism acquired according to a preset data acquisition time cycle with second survey data acquired according to the photographing time information, and as a result of the comparison, calculates the absolute coordinates of the target object using the survey data in which the time information is close within a threshold.

* * * * *